(12) United States Patent
Sunkara et al.

(10) Patent No.: US 8,629,236 B2
(45) Date of Patent: Jan. 14, 2014

(54) POLYESTER HAVING RENEWABLE 1,3-PROPANEDIOL

(75) Inventors: Hari Babu Sunkara, Hockessin, DE (US); Rajesh Gopalan Saliya, Media, PA (US); Ayumu Yokoyama, Clarkston, MI (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 9 days.

(21) Appl. No.: 12/891,829

(22) Filed: Sep. 28, 2010

(65) Prior Publication Data

US 2012/0077912 A1    Mar. 29, 2012

(51) Int. Cl.
*C08G 63/02* (2006.01)
*C08G 63/127* (2006.01)

(52) U.S. Cl.
USPC ........... 528/272; 528/271; 528/302; 528/308; 428/480

(58) Field of Classification Search
USPC ........... 524/604; 428/480; 525/437; 528/271, 528/272, 302, 308
See application file for complete search history.

(56) References Cited

U.S. PATENT DOCUMENTS

| | | | |
|---|---|---|---|
| 4,282,207 A * | 8/1981 | Young et al. | 424/486 |
| 6,235,102 B1 * | 5/2001 | Parekh et al. | 106/287.22 |
| 7,728,175 B1 | 6/2010 | Qi et al. | |
| 2004/0186247 A1 * | 9/2004 | Vandevoorde | 525/454 |
| 2005/0080223 A1 * | 4/2005 | Tuominen et al. | 528/272 |
| 2007/0128459 A1 * | 6/2007 | Kurian et al. | 428/480 |
| 2007/0254969 A1 | 11/2007 | Olah et al. | |
| 2008/0081898 A1 * | 4/2008 | Ross et al. | 528/308.6 |
| 2009/0312485 A1 | 12/2009 | Page et al. | |

FOREIGN PATENT DOCUMENTS

| | | | |
|---|---|---|---|
| WO | WO 2006/102279 | * | 9/2006 |
| WO | 2009/155085 | | 5/2009 |
| WO | 2009/155086 | | 5/2009 |

* cited by examiner

*Primary Examiner* — Lorna M Douyon
*Assistant Examiner* — Amina Khan
(74) *Attorney, Agent, or Firm* — Ingrassia Fisher & Lorenz, P.C.

(57) ABSTRACT

The present disclosure is directed to a polyester having renewable 1,3-propanediol. This invention is further directed to a coating composition comprising the polyester having components derived from renewable resources.

4 Claims, No Drawings

POLYESTER HAVING RENEWABLE 1,3-PROPANEDIOL

FIELD OF DISCLOSURE

The present disclosure is directed to a polyester polymer having carbon components derived from renewable resources, particularly, bio-derived 1,3-propanediol. This disclosure is further directed to a coating composition comprising 1,3-propanediol, the polyester that has components derived from renewable resources, or a combination thereof.

BACKGROUND OF DISCLOSURE

The production of chemical products, chemical intermediates, solvents for chemical reactions, monomers and the polymers produced from monomers is an important industry. The chemical industry supplies many of the raw materials and finished products that are in use today. Many of the components that are supplied by the chemical industry are produced using petroleum feedstock as the initial source. Some of these components can be refined or otherwise purified directly from the petroleum. Other components need to be subject to further processes or chemical reactions to produce the desired products, or intermediates.

With a growing world population, the demand for products produced in the chemical industry is also increasing. This growing demand places a high burden on the remaining petroleum feedstock, a non-renewable resource.

A need exists to produce chemical products and chemical intermediates from resources other than petroleum. There have been attempts in the past to produce chemicals wherein at least part of the molecule is renewably resourced.

STATEMENT OF DISCLOSURE

This invention is directed to a polyester comprising renewable carbon component from renewable resources.

This invention is also directed to a coating composition comprising bio-derived 1,3-propanediol, a polyester polymerized from monomers comprising bio-derived 1,3-propanediol, or a combination thereof.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "(meth)acrylate" means methacrylate or acrylate.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, high gloss, mar-resistance and resistance to environmental etching.

The term "one-pack coating composition", also known as 1K coating composition, refers to a coating composition having one package that is stored in one container and sealed to increase the shelf life of the coating composition during storage. The 1K coating composition can be formulated to be cured at certain curing conditions. Examples of such curing conditions can include: radiation, such as UV radiation including UV-A, UV-B, and UV-C radiations, electron beam (e-beam) radiation, infrared (IR) radiation, or lights in visible or invisible wavelengths; moisture, such as water accessible to the coating composition; heat energy, such as high temperatures; or other chemical or physical conditions.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a workable combination thereof.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

This disclosure is directed to a polyester comprising renewable carbon component from renewable resources. The renewable carbon component can have a "fraction of modern carbon" ($f_M$) value equal to or greater than 1.1.

The polyester can be a linear polyester, a branched polyester, or a combination thereof. The linear polyesters can have a weight average molecular weight in a range of from 500 to 5,000 and can be polymerized from monomers comprising bio-derived 1,3-propanediol. The branched polyesters have a weight average molecular weight in a range of from 1,000 to 50,000 and can be polymerized from monomers comprising bio-derived 1,3-propanediol.

The renewable carbon component can comprise bio-derived 1,3-propanediol. The renewable carbon component can be at least 1% of the total solid weight of the polyester. In one example the polyester can have in a range of from 1% to 50% of the bio-derived 1,3-propanediol. In another example, polyester can have in a range of from 5% to 50% of the bio-derived 1,3-propanediol. In yet another example, polyester can have in a range of from 10% to 50% of the bio-derived 1,3-propanediol. In addition to the bio-derived 1,3-propanediol, bio-derived acids and bio-derived polyhydric alcohols can also be used to produce the polyester.

The polyester can comprise one or more crosslinkable functional groups. The one or more crosslinkable functional groups can be selected from hydroxyl, thiol, isocyanate, thioisocyanate, acid or polyacid, acetoacetoxy, carboxyl, primary amine, secondary amine, epoxy, anhydride, glycidyl, ketimine, aldimine, silane, cyclic amide, or a workable combination thereof.

The polyesters are the esterification product of one or more polyhydric alcohols, such as, alkylene diols and glycols; and acids, such as monocarboxylic acids and polycarboxylic acids or anhydrides thereof, such as, dicarboxylic and/or tricarboxylic acids or tricarboxylic acid anhydrides. The polyester can comprise one or more aforementioned crosslinkable functional groups, such as hydroxyl crosslinkable functional groups. Typical polyesters can have an acid value of 15 to 60 and have a weight average molecular weight (Mw) from 500 to 50,000. The polyesters can be saturated or unsaturated and optionally, chemically modified. The polyester can be a linear polyester or a branched polyester.

The polyesters can have a Tg (glass transition temperature) in a range of from −75° C. to 75° C.

Examples of polyhydric alcohols that can be used to form the polyester can include triols, tetraols, and pentaols, such as, trimethylol propane, triethylol propane, trimethylol ethane, glycerine, and dihydric alcohols and diols that include ethylene glycol, propylene glycol, 1,3-propanediol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexane dimethanol, hydrogenated bisphenols A and F, Esterdiol 204 (Trademark of Union Carbide) and highly functional polyols, such as, trimethylolethane, trimethylolpropane, and pentaerythritol. Polyhydric alcohols having carboxyl groups can be used, such as, dimethylol propionic acid (DMPA).

Typical acids and anhydrides that can be used to form the polyester can include aliphatic or aromatic carboxylic acids and anhydrides thereof, such as, adipic acid, azelaic acid, sebacic acid, dimerized fatty acids, maleic acid, maleic anhydride, succinic acid, succinic anhydride, isophthalic acid, terephthalic acid, phthalic acid, phthalic anhydride, dimethyl terephthalic acid, naphthalene dicarboxylic acid, tetrahydro- and hexahydrophthalic anhydride, tetrachlorophthalic acid, terephthalic acid bisglycol ester, benzophenone dicarboxylic acid, trimellitic acid and trimellitic anhydride.

One example of a polyester can be polymerized from monomers comprising bio-derived 1,3-propanediol.

The polyester can be a highly branched copolyester. The highly branched copolyester can have a weight average molecular weight in a range of from 1,000 to 50,000, with one example in the range of 1,000-40,000, another example in the range of 1,500-40,000, yet another example in the range of 1,500 to 30,000, and yet another example in the range of 2,000 to 30,000. The highly branched copolyester can have one or more aforementioned crosslinkable function groups.

The highly branched polyester can be conventionally polymerized from a monomer mixture containing a chain extender comprising a hydroxy carboxylic acid, a lactone of a hydroxy carboxylic acid and a combination thereof; or one or more hyper branching monomers.

One example of a highly branched polyester can be polymerized from monomers comprising dimethylol propionic acid, pentaerythritol, caprolactone, and bio-derived 1,3-propanediol.

Conventional methods for synthesizing polyesters are known to those skilled in the art. Examples of the conventional methods can include those described in U.S. Pat. No. 5,270,362 and U.S. Pat. No. 6,998,154.

Bio-derived 1,3-propanediol (Bio-PDO) refers to 1,3-propanediol produced from a bio-route, such as via fermentation of a renewable resource. One example of the renewable resource can be corn since it is readily available and has a high rate of conversion to 1,3-propanediol and can be genetically modified to improve yields to the 1,3-propanediol. Examples of typical bio-route can include those described in U.S. Pat. No. 5,686,276, U.S. Pat. No. 5,633,362 and U.S. Pat. No. 5,821,092. The 1,3-propanediol obtained from the renewable source and the polyesters therefrom can be distinguished from their petrochemical derived counterparts on the basis of radiocarbon dating such as fraction of modern carbon ($f_M$), also know as $^{14}C$ ($f_M$) and dual carbon-isotopic fingerprinting $^{13}C/^{12}C$ such as the one known as $\delta^{13}C$. The fraction of modern carbon $f_M$ is defined by National Institute of Standards and Technology (NIST) Standard Reference Materials (RFMs) 4990B and 4990C.

The method usefully distinguishes chemically-identical materials, and apportions carbon in the polymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," Characterization of Environmental Particles, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship $$t = (-5730/0.693)\ln(A/A_0)$$

where t=age, 5730 years is the half-life of radiocarbon, and A and $A_0$ are the specific $^{14}C$ activity of the sample and of the modern standard, respectively (Hsieh, Y., Soil Sci. Soc. Am J., 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere, such as current plant materials or components derived from current plant materials, herein referred to as new carbon materials, $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the present disclosure is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphoenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., J. Agric. Food Chem., 45, 2942 (1997)). Coal and petroleum fall generally in this latter range. The $^{13}C$ measurement scale was originally defined by a zero set by pee dee belemnite (herein referred to as PDB) limestone, where values are given in parts per thousand deviations from this material. The "$\delta^{13}C$" values are in parts per thousand (per mil), abbreviated as ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000‰$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Bio-derived 1,3-propanediol, and compositions, such as polyesters, comprising bio-derived 1,3-propanediol, therefore, can be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new carbon materials" and "old carbon materials" (for example, carbon materials from petroleum products) can be distinguished from products made only of "old carbon materials" by isotope profiles.

The 1,3-propanediol used as the reactant or as a component of the reactant, such as a monomer for polymerization of a polyester polymer, can have a purity of greater than about 99%, and more preferably greater than about 99.9%, by weight as determined by gas chromatographic analysis. Examples can include the purified 1,3-propanediols as disclosed in US20040260125A1, US20040225161A1 and US20050069997A1.

The purified 1,3-propanediol can have one or more of the following characteristics:

(1) an ultraviolet absorption at 220 nm of less than about 0.200, and at 250 nm of less than about 0.075, and at 275 nm of less than about 0.075;

(2) a composition having L*a*b*"b*" color value of less than about 0.15 (ASTM D6290), and an absorbance at 270 nm of less than about 0.075;

(3) a peroxide composition of less than about 10 ppm;

(4) a concentration of total organic impurities (organic compounds other than 1,3-propanediol) of less than about 400 ppm, more preferably less than about 300 ppm, and still more preferably less than about 150 ppm, as measured by gas chromatography; or (5) a combination thereof.

This disclosure is further directed to a coating composition comprising bio-derived 1,3-propanediol, a polyester polymerized from monomers comprising bio-derived 1,3-propanediol, or a combination thereof.

The bio-derived 1,3-propanediol can be used in the coating composition as a solvent, a reactive diluent, or a combination thereof.

The polyester can be polymerized from monomers comprising the bio-derived 1,3-propanediol and aforementioned acids. The polyester can also be polymerized from monomers comprising the bio-derived 1,3-propane diol, aforementioned other alcohols, and the aforementioned acids. The polyester can comprise one or more aforementioned crosslinkable functional groups.

The coating composition can further comprise a crosslinking component having one or more crosslinking agents that have one or more crosslinking functional groups.

The one or more crosslinking functional groups can comprise isocyanate group. The crosslinking agent can be selected from aliphatic polyisocyanates, cycloaliphatic polyisocyanates, aromatic polyisocyanates, trifunctional isocyanates, isocyanate adducts, or a combination thereof. The crosslinking agent can also be selected from isophorone diisocyanate, toluene diisocyanate, hexamethylene diisocyanate, diphenylmethane diisocyanate, triphenyl triisocyanate, benzene triisocyanate, toluene triisocyanate, the trimer of hexamethylene diisocyanate, or a combination thereof.

Further examples of suitable aliphatic, cycloaliphatic and aromatic polyisocyanates can include: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation under the registered trademark and the trimer of isophorone diisocyanate can also be suitable.

Other suitable crosslinking components can include melamine formaldehyde, benzoguanamine formaldehyde, and urea formaldehyde.

A silane crosslinking component also can be suitable. One example of silane crosslinking component can be an aminofunctional silane crosslinking agent. Examples of suitable aminofunctional silanes can include aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta(aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(aminoethyl)gamma-aminopropyltrimethoxysilane commercially sold as Silquest® A 1120 and diethylene triamino propylaminotrimethoxysilane that is commercially sold as Silquest® A 1130. Both of theses silanes are sold by OSi Specialties, Inc. Danbury, Conn., under respective registered trademarks.

When an amino silane crosslinking agent is used, additional amino functional curing agents, such as, primary, secondary and tertiary amines, that are well known in the art can be added. Typically, aliphatic amines containing a primary amine group, such as, diethylene triamine, and triethylene tetramine can be added. Tertiary amines, such as, tris-(dimethyl aminomethyl)-phenol can also be used.

The coating composition can further comprise one or more acrylic polymers, one or more solvents, one or more pigments, ultraviolet light stabilizers, ultraviolet light absorbers, antioxidants, hindered amine light stabilizers, leveling agents, rheological agents, thickeners, antifoaming agents, wetting agents, catalysts, or a combination thereof.

The acrylic polymer can comprise one or more aforementioned crosslinkable functional groups.

The pigments can be any pigments suitable for coating can be used. Conventional inorganic and organic colored pigments, metallic flakes and powders, such as, aluminum flake and aluminum powders; special effects pigments, such as, coated mica flakes, coated aluminum flakes colored pigments, a combination thereof can be used. Transparent pigments or pigments having the same refractive index as the cured binder can also be used.

Typical catalysts can include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

Typically, the coating composition can comprise up to 95% by weight, based on the weight of the coating composition, of one or more solvents. The coating composition of this disclosure can have a solid content in a range of from 20% to 80% by weight in one example, in a range of from 50% to 80% by weight in another example and in a range of from 60% to 80% by weight in yet another example, all based on the total weight of the coating composition. The coating composition of this disclosure can also be formulated at 100% solids by using a low molecular weight acrylic resin reactive diluent.

Any typical organic solvents can be used to form the coating composition of this disclosure. Examples of solvents include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

The coating composition should comprise water. The coating composition can be formulated as a solvent borne coating composition that comprises in a range of from 0% to 20% of water in one example, 0 to 15% of water in another example, 0 to 10% of water in yet another example, 0 to 5% of water in a further example, and 0 to 2% of water in yet another example. The coating composition can also be formulated as a waterborne coating composition that comprises more than 20% of water. All percentage based on the total weight of the coating composition.

The coating composition of this disclosure can also comprise one or more ultraviolet light stabilizers in the amount of 0.01% to 10% by weight, based on the weight of the coating composition. Examples of such ultraviolet light stabilizers can include ultraviolet light absorbers, screeners, quenchers, and hindered amine light stabilizers. An antioxidant can also be added to the coating composition, in the amount of about 0.01% to 5% by weight, based on the weight of the coating composition.

Typical ultraviolet light stabilizers that are suitable for this disclosure can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, N.Y., under respective registered trademark, can be used.

Typical ultraviolet light absorbers that are suitable for this disclosure can include hydroxyphenyl benzotriazoles and derivatives; hydroxyphenyl s-triazines and derivatives; and hydroxybenzophenone U.V. absorbers and derivatives.

Typical antioxidants that are known to or developed by those skilled in the art can be suitable. Examples of commercially available antioxidants can include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals, under respective registered trademarks.

Typical hindered amine light stabilizers can include N-(1,2,2,6,6-pentamethyl-4-piperidinyl)-2-dodecyl succinimide, N(1 acetyl-2,2,6,6-tetramethyl-4-piperidinyl)-2-dodecyl succinimide, N-(2 hydroxyethyl)-2,6,6,6-tetramethylpiperidine-4-ol-succinic acid copolymer, 1,3,5 triazine-2,4,6-triamine, N,N'''-[2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5 bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-2l-oxo-7-oxa-3,20-diazal dispiro(5.1.11.2)henicosan-20-yl)propionate.

The coating compositions of this disclosure can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered tradmarks, leveling agents based on (meth)acrylic homopolymers; rheological control agents, such as highly disperse silica, fumed silica or polymeric urea compounds; thickeners, such as partially crosslinked polycarboxylic acid or polyurethanes; antifoaming agents; catalysts for the crosslinking reaction of the OH-functional binders, for example, organic metal salts, such as, dibutyltin dilaurate, zinc naphthenate and compounds containing tertiary amino groups, such as, triethylamine, for the crosslinking reaction with polyisocyanates. The additives are used in conventional amounts familiar to those skilled in the art.

The coating compositions according to the disclosure can further contain reactive low molecular weight compounds as reactive diluents that are capable of reacting with the crosslinking agent. For example, low molecular weight polyhydroxyl compounds, such as, ethylene glycol, propylene glycol, trimethylolpropane and 1,6-dihydroxyhexane can be used.

Depending upon the type of crosslinking agent, the coating composition of this invention can be formulated as one-pack (1K) or two-pack (2K) coating composition. For example, if polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition. The coating composition can be further adjusted to spray viscosity with organic solvents as determined by those skilled in the art before being applied.

The coating composition according to the disclosure can be suitable use as a primer, a basecoat, a color coat, a top coat, or a clear coat. The coating composition of this disclosure can also be used in wet-on-wet coating applications. In one example, a primer, a basecoat and a clear coat can be applied over a substrate in a wet-on-wet coating application process and cured all together. In another example, a basecoat and a clear coat can be applied in a wet-on-wet coating application process and cured together.

The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

The coating composition can be applied by conventional techniques, such as, spraying, electrostatic spraying, dipping, brushing, and flow coating.

The linear or the branched polyesters, or a combination thereof can be suitable for this invention. In one example, only linear polyesters are used in the coating composition. In another example, only the branched polyesters are used in the coating composition. In yet another example, both the linear and the branched polyesters are used in the coating composition. Typically, the coatings comprising the branched polyesters can have lower viscosity, shorter dry-to-touch time and better early hardness comparing to the coatings comprising the linear polyesters. The shorter dry-to-touch time and higher early hardness are typically useful for increasing productivity in coating applications since the substrates being coated can be moved to next coating process in a shorter time.

This disclosure is further directed to a substrate coated with the aforementioned coating composition. The substrate can be a vehicle, a vehicle body part, or a combination thereof.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Example 1

Linear Polyesters

A polyester can be prepared by charging the following ingredients according to Table 1 into a reaction vessel equipped with a heating mantle, water separator, thermometer and stirrer, and under nitrogen.

TABLE 1

| Reaction Ingredients (grams). | |
|---|---|
| | Weight |
| Portion 1 | |
| Xylene | 19.553 |
| Pentaerythritol | 93.58 |
| Benzoic acid | 167.89 |
| Portion 2. | |
| Neopentyl glycol | 227.58 |
| Isophthalic acid | 142.80 |
| Phthallic anhydride | 127.29 |
| Adipic acid | 62.78 |
| Xylene | 15.26 |
| 1,3-Propanediol[(1)] | 48.76 |
| Portion 3 | |
| Ethyl acetate | 113.51 |

[(1)]1,3-propanediol (PDO) monomers are from DuPont Tate & Lyle Bioproducts, Wilmington, DE, USA, Portion 1 is added to the reactor and heated to its reflux temperature, about 190° C. The reactor is heated stepwise to 215° C. and held until the acid number is 33 or less. After cooling the reactor to 80° C., Portion 2 is added and the reactor is heated to reflux, about 175° C. The temperature is then increased stepwise to 215° C. That temperature is held until an acid number between 3 and 7 at about 98 wt % (weight percent) solids is reached. Portion 3 is added after cooling to about 80° C.

Example 2

Branched Polyesters

A branched polyester can be prepared by charging the following ingredients in Table 2 into a reaction vessel equipped with a heating mantle, short path distillation head with a water separator, thermometer and stirrer, and under nitrogen.

TABLE 2

| Reaction Ingredients (Parts by Weight). | |
|---|---|
| | Parts by weight |
| Portion 1 | |
| Caprolactone | 363.48 |
| Stannous octoate | 2.83 |
| Xylene | 43.52 |
| 1,3-Propanediol[(1)] | 6.28 |
| Portion 2 | |
| Dimethylol propionic acid | 188.02 |
| Pentaerythritol | 7.62 |
| Portion 3 | |
| Methyl amyl ketone | 252.22 |

[(1)]1,3-propanediol (PDO) monomers are from DuPont Tate & Lyle Bioproducts, Wilmington, DE, USA, Portion 1 is added to the reactor in order with mixing and heated to about 70° C. Portion 2 is then added to the reactor and the reaction mixture is heated to its reflux temperature (170-200° C.) and the water of reaction is collected in the water separator. The reaction mixture is not allowed to exceed 200° C. and is held at temperature until an acid number less than 3 at about 93 wt % solids is obtained. The polymer solution is thinned with Portion 3 to desired solids and viscosity.

What is claimed is:

1. A polyester prepared from a mixture consisting of bio-derived 1,3-propanediol, pentaerythritol, benzoic acid, neopentyl glycol, isophthalic acid, phthallic anhydride, adipic acid, xylene and ethyl acetate; or prepared from a mixture consisting of bio-derived 1,3-propanediol, pentaerythritol, caprolactone, dimethylol propionic acid, xylene, stannous octoate and methyl amyl ketone.

2. The polyester of claim 1, wherein the renewable carbon content of said polyester is at least 1% of the total solid weight of the polyester.

3. The polyester of claim 1 wherein the polyester has a weight average molecular weight in the range of from 500 to 5,000, and a Tg in a range of from −75° C. to 75° C.

4. The polyester of claim 1 wherein the polyester has hydroxyl functional groups.

* * * * *